Sept. 19, 1961 R. W. GOELDNER 3,000,795
ACID FEED TREATMENT
Filed Feb. 29, 1956
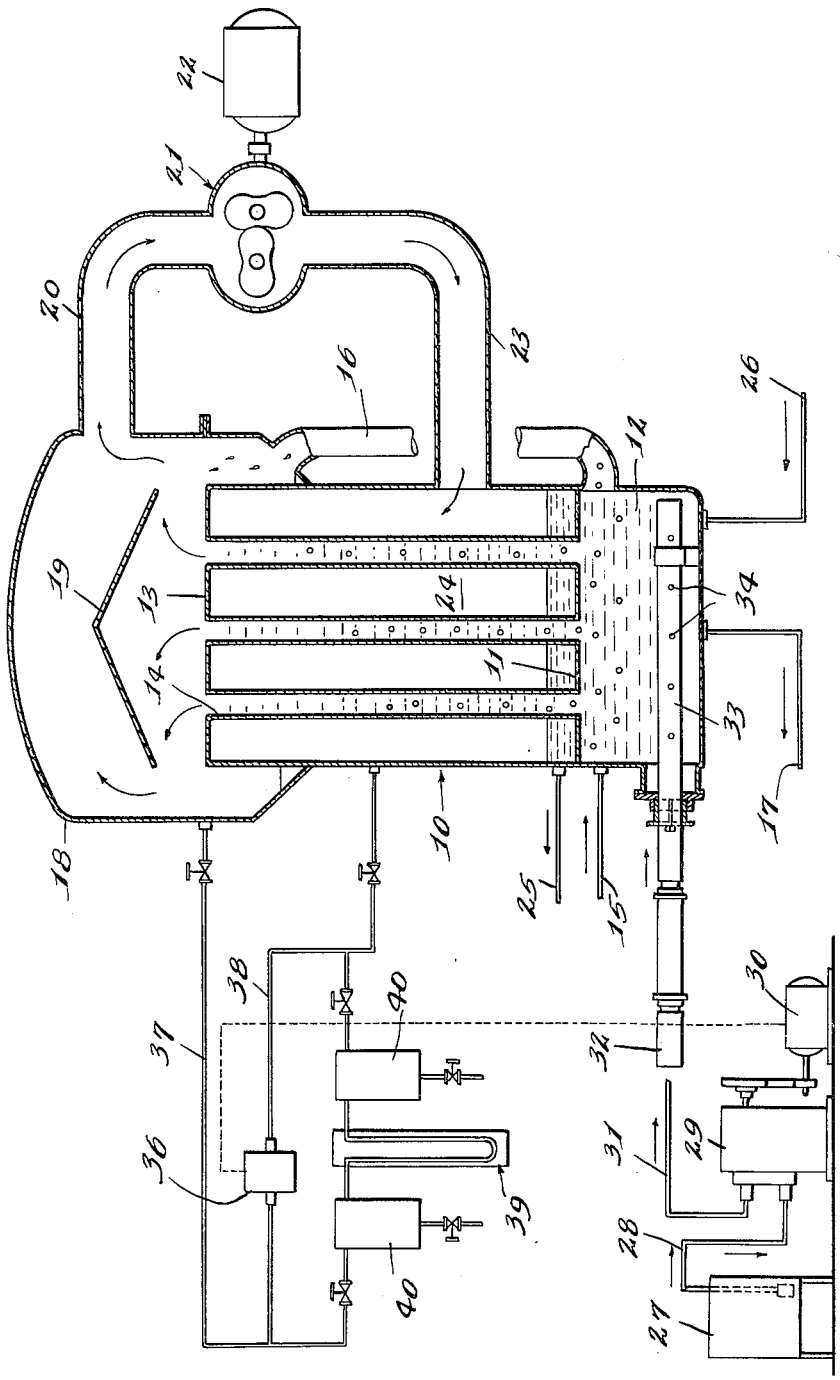
Inventor
Richard W. Goeldner
By Schroeder, Hofgren, Brady & Wegner
Attorneys

3,000,795
ACID FEED TREATMENT
Richard W. Goeldner, Milwaukee, Wis., assignor, by mesne assignments, to Aqua-Chem, Inc., Waukesha, Wis., a corporation of Wisconsin
Filed Feb. 29, 1956, Ser. No. 568,578
4 Claims. (Cl. 202—57)

This invention relates to water handling equipment such as evaporators, and particularly vapor compression distillers utilizing sea water feed, and to a method of and apparatus for controlling the formation of scale deposits which adhere to the inside walls of such equipment.

It is a general object of the invention to provide a new and improved method of and apparatus for controlling scaling in water handling equipment of the character described.

Evaporating and distilling plants have many applications, such as, for example, use aboard ships and submarines operating in salt water wherein such apparatus is utilized to obtain fresh water by evaporating sea water and condensing the vapor therefrom. Evaporating and distilling apparatus for this purpose and for similar purposes should preferably be capable of operation continuously and economically over long periods of time.

When sea water distilling plants are rated on the basis of cost per unit of distilled water produced, the vapor compression type appears to be the most efficient, unless adjacent processes create a source of inexpensive heat. However, the vapor compression type distilling plant is subject to rather severe scaling rates. The methods of attacking the problem of scaling vary somewhat, but generally where scaling is reduced significantly it is done at the expense of increased energy costs as, for instance, by forced circulation in the evaporator.

The operating period between descaling operations for a vapor compression plant is usually about 600 to 700 hours when the plant is operated on so-called "normal" sea water, after which the plant must be shut down to permit the removal of scale. In certain areas of the world, particularly where sea water temperatures are high, the chemical composition of the sea water is altered in favor of higher scaling rates thus reducing the operating period between shutdowns for descaling.

During the operating period between cleanings, the fuel or power required per unit of distillate produced increases until when fully scaled, power consumption is about one and one-half times as great as it was just after cleaning. Therefore, it can be readily seen that scaling has at least two adverse effects on the operation of vapor compression distilling plants, namely, increased power consumption per unit of distillate produced, and periodic shutdown requirements for cleaning.

Accordingly, it is a more specific object of the invention to provide for continuous scale control in an evaporator to reduce energy consumption costs and to avoid the necessity of periodic shutdown for scale removal.

The scales produced in sea water distilling plants are principally composed of calcium carbonate and magnesium hydroxide. When sea water temperatures exceed 190° F., scale compositions are predominantly magnesium hydroxide. Where sea water temperatures are below 170° F., the scale composition is predominantly calcium carbonate. In the temperature range between 170° F. and 190° F., the scales formed could contain significant amounts of both calcium carbonate and magnesium hydroxide. Both of these are removable by soaking the scaled portions of the plant in dilute hydrochloric acid solutions, commonly called muriatic acid.

Therefore, another object is to provide a new and improved method of and apparatus for feeding a chemical to the saline feed solution in an evaporator during operation of the evaporator so as to avoid scaling.

A further object is to provide a new and improved method of and apparatus for detecting the formation of scale in a vapor compression distiller and feeding an acid solution to the saline feed water in quantities dependent on the amount of scale formation detected so as to control scaling during operation.

The magnesium hydroxide and calcium carbonate scales formed in sea water distilling plants are the result of the decomposition of the bicarbonate ions in sea water and their subsequent reaction with some of the magnesium and calcium ions also found in sea water. Decomposition of the bicarbonate ions forms carbonate ions, carbon dioxide gas, and water. Some of the carbonate ions thus produced react with the calcium ions present to form insoluble calcium carbonate. The remainder of the carbonate ions react with water to form carbon dioxide and hydroxide ions. The hydroxide ions thus formed then in turn react with the magnesium ions present to form insoluble magnesium hydroxide scale.

In "normal" sea water, the ratio of the chemical equivalents of calcium and magnesium ions to bicarbonate ions is about 50:1. Therefore, the limiting reactant as far as scale formation is concerned is the bicarbonate ion. The concentrations of calcium and magnesium ions could be varied greatly without affecting scale rates appreciably, but slight variations in the bicarbonate ion concentration would have pronounced effects upon scaling rates. For example, recent tests using sea water having a 15% greater bicarbonate ion concentration than that found in "normal" sea water indicate that the 15% increase in bicarbonate ion concentration will reduce the operating time between cleanings about one-third.

According to the present invention, sea water fed to the evaporator is treated with an acid solution during operation of the evaporator to obtain a substantial reduction in scaling rates. This method of treatment goes directly to the heart of the scaling problem by reducing the bicarbonate ion concentration of the feed water before it can form scale deposits. The muriatic acid supplied releases hydrogen ions which combine with the bicarbonate ions to form harmless carbon dioxide gas and water.

In a vapor compression distilling plant wherein vapors evolved from the feed water in the evaporator are compressed and returned to heat the feed water in out of contact heat exchange, the differential pressure across the vapor compressor is indicative of cleanliness, scaling, and the bicarbonate ion concentration in the evaporator. According to the present invention, use is made of this differential pressure as a control to regulate the rate of feed of acid solution to the feed water.

Thus, it is also an object of this invention to provide a new and improved method of and apparatus for feeding an acid solution for mixture with the saline feed water in a vapor compression distiller, increasing the acid feed in proportion to increased bicarbonate ion concentration in the feed water, and decreasing the acid feed in proportion to decreased bicarbonate ion concentration in the feed water, to thereby control scaling during operation of the distiller.

Another object is to provide in a vapor compression distiller wherein vapors evolved from the boiling saline feed water are compressed and returned to heat the feed water in out of contact heat exchange, a new and improved method of and apparatus for determining the pressure differential across the compressor, and varying the feed of an acid solution for mixture with the saline feed water in response to variations in the pressure differential.

Other objects and advantages will become readily apparent from the following detailed description taken in connection with the accompanying drawings in which the single figure is a diagrammatic showing, with parts broken away, of a vapor compression distilling apparatus illustrating the principles of my invention.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings, the invention is illustrated in connection with an evaporator 10 having a generally cylindrical configuration, and having secured therein a tube sheet 11 spaced upwardly from the bottom. The tube sheet 11 serves to define a feed water solution chamber 12 in the lower part of the evaporator. A second tube sheet 13 is secured adjacent the upper part of the evaporator, and tubes 14 are secured to and extend in a vertical direction between the two tube sheets 11 and 13. Available sea water is fed to the boiling chamber 12 through an inlet pipe 15 and is heated in a manner described presently and boils up the tubes 14, over the top, and returns to the lower chamber 12 through downspouts such as that indicated in 16. Sea water is fed continuously to the evaporator in suitable quantities, and blowdown is continuously drawn from the bottom of the evaporator through an outlet pipe 17.

Vapor evolved from the boiling salt water solution in the evaporator rises upwardly in a vapor space provided by a bonnet 18 forming the top of the evaporator. Droplets of liquid entrained in the rising vapors strike a baffle 19 and fall out to return to the boiling solution. Vapor in the chamber provided by the bonnet 18 is withdrawn into a conduit 20 which forms an inlet to a compressor 21 which may be driven by a motor 22. In compressing the vapor, heat is imparted thereto, and the vapor is returned to the evaporator and utilized to heat the feed water solution in out of contact heat exchange therewith, while at the same time condensing the vapor into the desired distillate. Thus, the outlet from the compressor 21 is connected to a conduit 23 which leads from the compressor to a chamber 24 formed in the evaporator about the tubes 14 and between the tube sheets 11 and 13. In the chamber 24, the heat contained in the compressed vapor is transferred to the feed water solution to raise the temperature to boiling; at the same time the vapor is condensed and subsequently withdrawn through a pipe 25 to suitable storage means.

Once operation of the distilling apparatus is established and stabilized, the compressed vapor from the compressor 21 forms the sole source of heat for the feed water solution to obtain evaporation. On initiating operation, however, some auxiliary source of heat may be necessary to initially raise the temperature of the feed water to boiling. Such auxiliary heat may be supplied in the form of steam or preheated feed water through a conduit 26 leading to the bottom of the evaporator from any available source of such auxiliary heat.

In accordance with the present invention, muriatic acid may be supplied to the evaporator for mixture with the feed water from a supply container 27 having a supply line leading therefrom and connected to a suitable pumping apparatus 29. The pumping apparatus may be driven by an electric motor 30 to pump the acid solution from the container 27 through a line 31 to a nozzle 32 for delivery to a distribution header or manifold 33 arranged in the bottom of the feed water chamber 12 and having discharge openings 34 for distributing the acid in the feed water solution.

When ideal conditions exist, including complete absence of scale in the chamber 12 and in the tubes 14, an optimum amount of heat is transferred from the vapor in the chamber 24 to the feed water solution in the chamber 12 and the tubes 14. When scaling occurs on the walls of the chamber 12 and in the tubes 14, such scaling creates a barrier to the transfer of heat from the vapor in chamber 24 to the feed water solution, thus reducing the amount of vapor produced and consequently reducing the pressure on the inlet side of the compressor 21. Thus, where one pressure differential across the compressor exists under ideal conditions, this pressure difference increases with the increase of scaling in the evaporator. Consequently, the pressure differential is indicative of the cleanliness or scaling within the evaporator which in turn is indicative of the scale forming constituents such as bicarbonate ions present in the sea water being utilized at the time.

According to the present invention, use is made of the pressure differential to control the amount of acid solution fed to the evaporator for mixture with the feed water. To this end, a pressure sensitive switching device or rheostat 36 of conventional construction is controlled by the pressure difference and functions to control the speed and operation of the motor 30 for driving the acid pumping apparatus. A line 37 leads from the vapor chamber in the bonnet 18 to one side of the pressure sensitive switching device or rheostat 36, and a line 38 leads from the chamber 24 to the opposite side of the device 36. Thus, the device is exposed on one side to the pressure of vapor before compression, and on the other side to the pressure of vapor after compression.

In operation, the pressure sensitive device 36 and the pump apparatus 29 may be set to provide under a normal pressure differential a normal rate of acid feed to the evaporator. In the event of an increase in the bicarbonate ion concentration and hence an increase in scaling, the pressure differential increases and the pressure sensitive device 36 functions to increase the rate of delivery of acid by the pumping apparatus 29. The increased acid fed then functions to decrease the scaling, whereupon the pressure difference decreases, and the acid feed decreases. The pressure sensitive device 36 may function to stop the pumping apparatus entirely if the pressure difference attains a predetermined minimum value which might indicate a sufficient concentration of acid to produce corosion within the evaporator and to start the pumping apparatus again when necessary. If desired, the apparatus described may be utilized in connection with a pH controller of conventional construction for stopping acid feed in the event of an acid concentration sufficient to cause corrosion in the evaporator.

A visual indication of the pressure difference across the compressor 21 may be given by means of a manometer 39 connected across the lines 37 and 38. Mercury traps 40 on opposite sides of the manometer 39 serve to prevent commingling of mercury from the manometer and vapor from the evaporator.

It is believed that the principles and operation of my method and apparatus will be understood from the foregoing. It will be appreciated that the apparatus described may function automatically without attention for extended periods of time without the necessity of shutdown periods for cleaning, while at the same time reducing heat losses and energy costs.

Under some conditions, it may be desirable to control the acid delivery apparatus manually. For example, the scale forming constituents present in the particular sea water encountered may be such that intermittent acid deliveries are preferable. In this event, the pumping apparatus may be started manually when the pressure differential read on the manometer indicates that treatment is necessary, after which the acid delivery may be manually or automatically terminated, and repeated whenever necessary.

While the invention has been illustrated in connection with a vapor compression distiller, it will be appreciated that the principles may be applied in connection with other distilling apparatus and evaporators and other water handling equipment.

I claim:

1. The method of controlling scale formation within a vapor compression distilling metal apparatus in order to permit generally constant distillate output from the apparatus, comprising the steps feeding an anti-scaling acidic material capable of hydrolyzing calcium carbonate and magnesium hydroxide into boiling solution within the distilling apparatus, varying the rate of said feeding to increase the same with increase of scale formation in excess of a predetermined scale condition upon heated metal surfaces within the apparatus by controlling the rate of said feeding in response to pressure difference across the vapor compressor of said apparatus to provide increase of said feed upon increase of scale formation in excess of said predetermined scale condition.

2. The method of controlling scale formation in a vapor compression distilling apparatus fed with a saline solution in order to permit generally constant distillate output from the apparatus, comprising the steps of feeding an acid capable of hydrolyzing calcium carbonate and magnesium hydroxide into saline solution in the apparatus, controlling the amount of acid so fed to release hydrogen ions for combination with a portion of the bicarbonate ions in the saline solution so as to produce carbon dioxide gas and water by varying the rate of feeding said acid into said solution during continued operation of the distilling apparatus to reduce the available bicarbonate ions in the solution prior to formation of an insoluble scale on heated metal parts of the apparatus, and varying the rate of feeding in response to sensed pressure differential across the vapor compressor of said distilling apparatus.

3. Vapor compression distilling apparatus, comprising: an evaporation chamber including a space for feed liquid to be evaporated and a vapor space above the feed liquid, a compressor for withdrawing vapors from said chamber space and compressing same for out-of-contact heat exchange with said feed liquid, said chamber being formed of metal walls for containing said feed liquid, said walls being in contact with the feed liquid and receiving scale therefrom when heated; a source of acid having a connection with said evaporation chamber for introducing acid into the feed liquid in said chamber in order to prevent undesired scale formation on the metal chamber walls; an acid feed control on said connection for varying the amount of acid so introduced to prevent an excess of acid from deleteriously attacking said metal, by a pressure responsive means connected across said compressor to sense the pressure variation thereacross and operatively connected for operating said acid feed control.

4. The method of controlling scale formation in solution in a vapor compression distilling apparatus, comprising the steps of feeding an acidic material capable of hydrolyzing calcium carbonate and magnesium hydroxide into solution within the apparatus, said acidic material being adapted to prevent scale formation on the walls of the apparatus from the solution, varying the rate of feeding said acidic material in proportion to the amount of scale formation on heated metal surfaces in the apparatus, by sensing the vapor pressure both on the suction side and on the discharge side of the vapor compressor for said distilling apparatus, reducing the rate of feed of said acidic material in response to a decrease in the difference between the sensed vapor pressures and increasing the rate of said acidic material feed in response to an increase in the difference between the sensed vapor pressures whereby to control scale formation within the distilling apparatus.

References Cited in the file of this patent

UNITED STATES PATENTS

| | | |
|---|---|---|
| 1,872,879 | Brandt | Aug. 23, 1932 |
| 2,222,575 | Schutte | Nov. 19, 1940 |
| 2,263,703 | Pendl | Nov. 25, 1941 |
| 2,299,748 | Hatch | Oct. 27, 1942 |
| 2,386,778 | Claffey | Oct. 16, 1945 |
| 2,487,884 | Lunt | Nov. 15, 1949 |
| 2,589,406 | Latham | Mar. 18, 1952 |
| 2,733,196 | Hillier et al. | Jan. 31, 1956 |

OTHER REFERENCES

Straub et al.: Ind. and Eng. Chem., 24, pages 1416–19 (1932).

Reed: Combustions, 19, 28–83 (May 1948), 19, 43–49 (June 1948).

Elliot: "Inds. Water and Ind. Waste Water," ASTN Special Technical Pub. No. 207 (pages 25–36; page 27 relied on) presented Sept. 20, 1956.

Betz Handbook of Industrial Water Conditioning, pages 66–69 (copyright 1957).